(12) United States Patent
Lim et al.

(10) Patent No.: US 8,542,625 B2
(45) Date of Patent: Sep. 24, 2013

(54) METHOD FOR TRANSMISSION AND CONFIGURATION OF RANGING CHANNEL IN ACCORDANCE WITH A VARIETY OF FRAME STRUCTURES IN RADIO COMMUNICATION SYSTEM

(75) Inventors: Dong-Guk Lim, Gyeonggi-Do (KR); Jin-Sam Kwak, Gyeonggi-Do (KR); Ki-Seon Ryu, Gyeonggi-Do (KR); Jong-Young Han, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 222 days.

(21) Appl. No.: 13/126,750

(22) PCT Filed: Nov. 2, 2009

(86) PCT No.: PCT/KR2009/006397
§ 371 (c)(1),
(2), (4) Date: Apr. 28, 2011

(87) PCT Pub. No.: WO2010/062052
PCT Pub. Date: Jun. 3, 2010

(65) Prior Publication Data
US 2011/0205958 A1 Aug. 25, 2011

Related U.S. Application Data

(60) Provisional application No. 61/110,560, filed on Nov. 1, 2008.

(30) Foreign Application Priority Data

Nov. 2, 2009 (KR) .................... 10-2009-0104868

(51) Int. Cl.
*H04Q 7/24* (2006.01)
*H04Q 7/00* (2006.01)
*H04L 12/28* (2006.01)

*H04W 4/00* (2009.01)
*H04W 36/00* (2009.01)

(52) U.S. Cl.
USPC ........... 370/315; 370/338; 370/331; 370/329; 370/431; 455/434; 455/436

(58) Field of Classification Search
None
See application file for complete search history.

(56) References Cited

U.S. PATENT DOCUMENTS
2007/0082621 A1 4/2007 Lee et al.
(Continued)

FOREIGN PATENT DOCUMENTS
EP 1571770 A2 9/2005
KR 10-2008-0070153 A 7/2008

OTHER PUBLICATIONS

IEEE C803.16m-08/1429 ("Multi-hop Relay Operation Modes", IEEE 802.16 Broadband Wireless Access Working Group, Oct. 30, 2008).*
IEEE C802.16j-08/150 ("FDD and H-FDD frame structure for IEEE 802.16j Multi-hop Relay Networks", IEEE 802.16 Broadband Wireless Access Working Group, Sep. 15, 2008).*

(Continued)

*Primary Examiner* — Andrew Chriss
*Assistant Examiner* — Ajit Reddy
(74) *Attorney, Agent, or Firm* — Lee, Hong, Degerman, Kang & Waimey (57) ABSTRACT

The present invention relates to configuration procedures and transmission of a ranging channel for a synchronization of an uplink of user equipment and a relay station in a communication system which supports a relay, in that the configuration of the ranging channel for acquiring an uplink synchronization may vary in accordance with a variety of frame structures, thereby reducing uplink interferences and performing an uplink synchronization in a stable and quick manner.

13 Claims, 10 Drawing Sheets

(56) References Cited

U.S. PATENT DOCUMENTS

| | | | |
|---|---|---|---|
| 2007/0133460 A1* | 6/2007 | Sohn et al. | 370/329 |
| 2007/0280188 A1* | 12/2007 | Kang et al. | 370/338 |
| 2008/0159231 A1* | 7/2008 | Kim et al. | 370/331 |
| 2009/0227255 A1* | 9/2009 | Thakare | 455/434 |

OTHER PUBLICATIONS

P802.16Rev2/D4 ("Part 16: Air Interface for Broadband Wireless Access Systems", Draft Standard for Local and Metropolitan Area Networks, Apr. 2008).*

* cited by examiner

METHOD FOR TRANSMISSION AND CONFIGURATION OF RANGING CHANNEL IN ACCORDANCE WITH A VARIETY OF FRAME STRUCTURES IN RADIO COMMUNICATION SYSTEM

CROSS-REFERENCE TO RELATED APPLICATIONS

This application is the National Stage filing under 35 U.S.C. 371 of International Application No. PCT/KR2009/006397, filed on Nov. 2, 2009, which claims the benefit of earlier filing date and right of priority to Korean Application No. 10-2009-0104868, filed on Nov. 2, 2009, and also claims the benefit of U.S. Provisional Application Ser. No. 61/110,560, filed on Nov. 1, 2008, the contents of all of which are incorporated by reference herein in their entirety.

TECHNICAL FIELD

The present invention relates to a method for transmission and configuration of a ranging channel in accordance with a variety of frame structures in a radio communication system, and more particularly, to a method for transmission and configuration of a ranging channel for unlink synchronization of a mobile station (user equipment) and a relay station in a communication system which supports a relay.

BACKGROUND ART

The IEEE (Institute of Electrical and Electronics Engineers) 802.16 standard provides technologies and protocols for supporting broadband wireless access. The IEEE 802.16 has been standardized since 1999, and the IEEE 802.16-2001 was approved in 2001. This is based on a single carrier physical layer, 'WirelessMAN-SC'. Then, 'WirelessMAN-OFDM' and 'WirelessMAN-OFDMA' as well as 'WirelessMAN-SC' were further added to a physical layer of the IEEE 802.16a standard which was approved in 2003. The IEEE802.16-2004 standard revised after completion of the IEEE 802.16a standard was approved in 2004. The IEEE 802.16-2004/Cor1 was completed in 2005 in the form of 'corrigendum' so as to correct bugs and errors of the IEEE 802.16-2004 standard.

For reception and demodulation of data in a wireless communication system, a receiver and a transmitter have to be synchronized with each other. Especially, in a mobile communication system where a channel environment between a base station and a mobile station is continuously changed, synchronization has to be acquired through signaling between the BS and the MS for successful transmission and reception of data.

A communication channel between the BS and the MS largely consists of a downlink (DL) channel toward the MS from the BS, and an uplink (UL) channel toward the BS from the MS. In the DL corresponding to point-to-multipoint, a plurality of MSs are DL-synchronized with a data frame transmitted from the BS. For synchronization of the MSs, the BS may insert a preamble for synchronization into a part of a frame to be transmitted. Then, the MSs adjust DL-synchronization through the preamble. Here, the BS may use an additional synchronization channel.

In the UL, each MS has to transmit data to the BS in time and/or frequency domain allocated thereto so as to prevent interference between the MSs and so as to make the BS receive data. For UL synchronization, each MS is required to adjust synchronization through signaling with the BS, with consideration of a channel environment.

In the IEEE 802.16 standard, a signal transmitted and received between a BS and an MS for UL synchronization is defined as a ranging signal. Ranging is a series of procedures of controlling a transmission power and of adjusting time or frequency synchronization while the BS and the MS transmit and receive a ranging signal therebetween. That is, ranging may be referred to as a series of procedures for acquiring UL synchronization.

Initial ranging refers to a process of acquiring a precise timing offset between the MS and the BS, and a process of initially controlling a transmission power. Once power is turned on, the MS acquires DL synchronization from a DL preamble signal being received. Then, the MS performs initial ranging so as to adjust a timing offset and a transmission power. Differently from the initial ranging, periodic ranging refers to a process of periodically tracking a UL timing offset and a reception signal strength after the initial ranging.

Hereinafter, will be explained contention-based random access and non-contention-based random access by a mobile station (MS) for UL synchronization through a ranging channel.

In a 16m system which is undergoing a standardization process, contention-based random access and non-contention-based random access are performed for UL synchronization of an MS through a ranging channel. The contention-based random access is performed for initial ranging, periodic ranging and handover. On the other hand, the non-contention-based random access is performed for initial ranging and handover. In the 16m system, UL resources are partially allocated to the MS for random access through a ranging channel. Here, the MS may acquire a position and a size of the UL resources from control information transmitted from a BS. In the IEEE 802.16m system, a ranging channel is multiplexed through frequency division multiplex (FDM) with control channels and data transmission channels.

Hereinafter, the conventional 16m relay frame structure will be explained.

The conventional 16m relay frame structure is categorized into a uni-directional frame structure and a bi-directional frame structure according to an operation method of a relay station.

Figure 1:
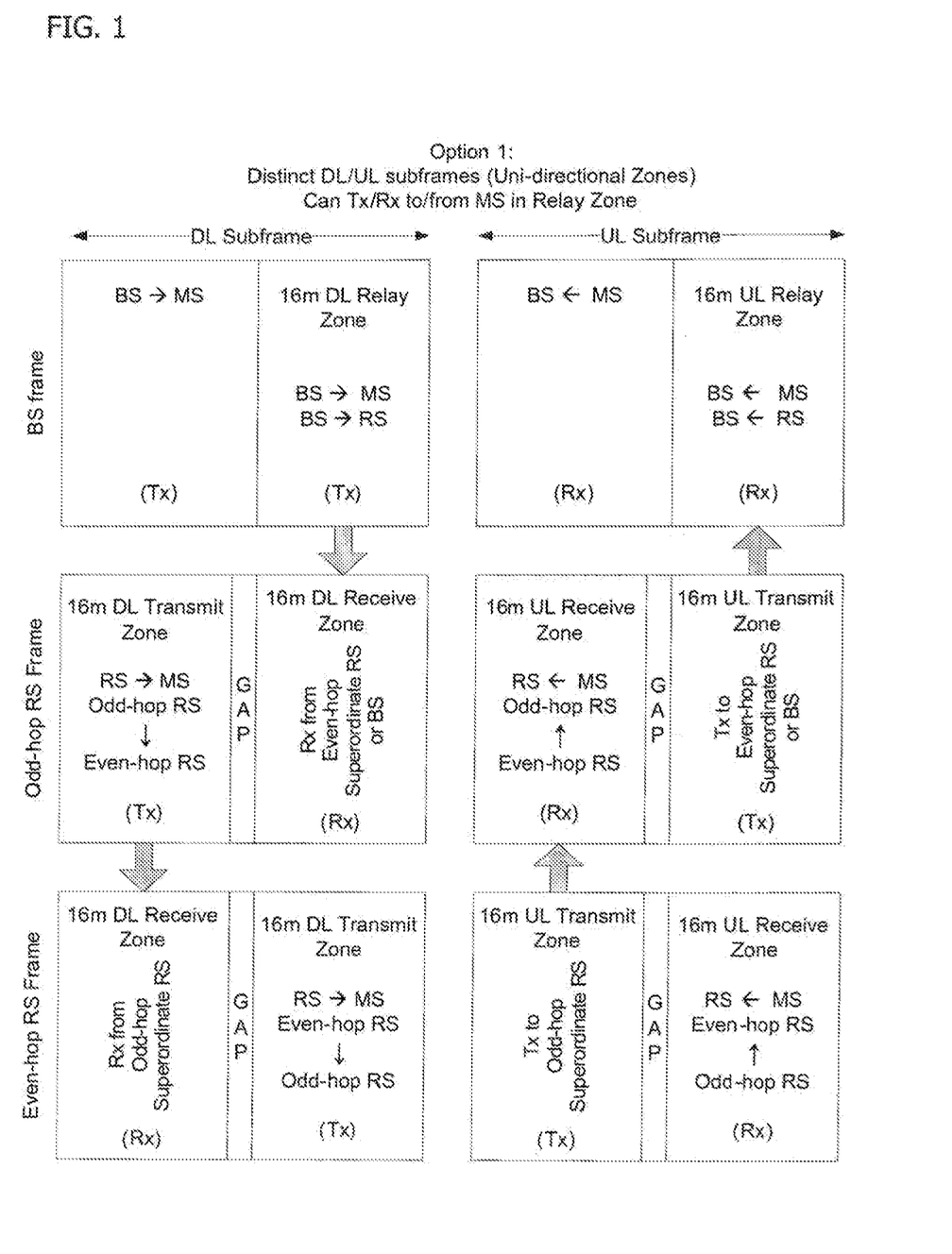
FIG. 1 illustrates an 802.16m uni-directional relay frame structure in accordance with the conventional art.

FIG. 1 illustrates an 802.16m uni-directional relay frame structure in accordance with the conventional art.

The conventional uni-directional relay frame structure and a function thereof will be explained with reference to FIG. 1. Referring to a vertical direction (i.e., column direction) of FIG. 1, the conventional 16m relay frame structure consists of a DL subframe and a UL subframe. Referring to a horizontal direction (i.e., row direction) of FIG. 1, the conventional 16m relay frame structure consists of a BS frame, an odd-hop RS frame and an even-hop RS frame.

A relay station (hereinafter, will be referred to as 'RS') is categorized into an odd-hop RS and an even-hop RS according to the number of hops with a base station.

A downlink of an odd-hop RS is divided into a 16m DL transmit zone and a 16m DL receive zone, and an uplink thereof is divided into a 16m UL receive zone and a 16m UL transmit zone.

(1-1) A 16m DL relay zone and a 16m UL relay zone of a BS

A 16m DL relay zone is a downlink zone of a BS, where the BS may transmit data to a 16m RS and a 16m MS.

A 16m UL relay zone is an uplink zone of a BS, where the BS may receive data from a 16m RS and a 16m MS.

(1-2) A DL transmit zone/receive zone and a UL transmit zone/receive zone of a 16m RS A 16m DL transmit zone is a downlink zone of a 16m RS, where the 16m RS may transmit data to a subordinate RS and a 16m mobile station (MS).

A 16m DL receive zone is a downlink zone of a 16m RS, where the 16m RS may receive data from a subordinate RS.

A 16m UL transmit zone is an uplink zone of a 16m RS, where the 16m RS may transmit data to a subordinate RS.

A 16m UL receive zone is an uplink zone of a 16m RS, where the 16m RS may receive data from a subordinate RS and a 16m MS.

Figure 2:
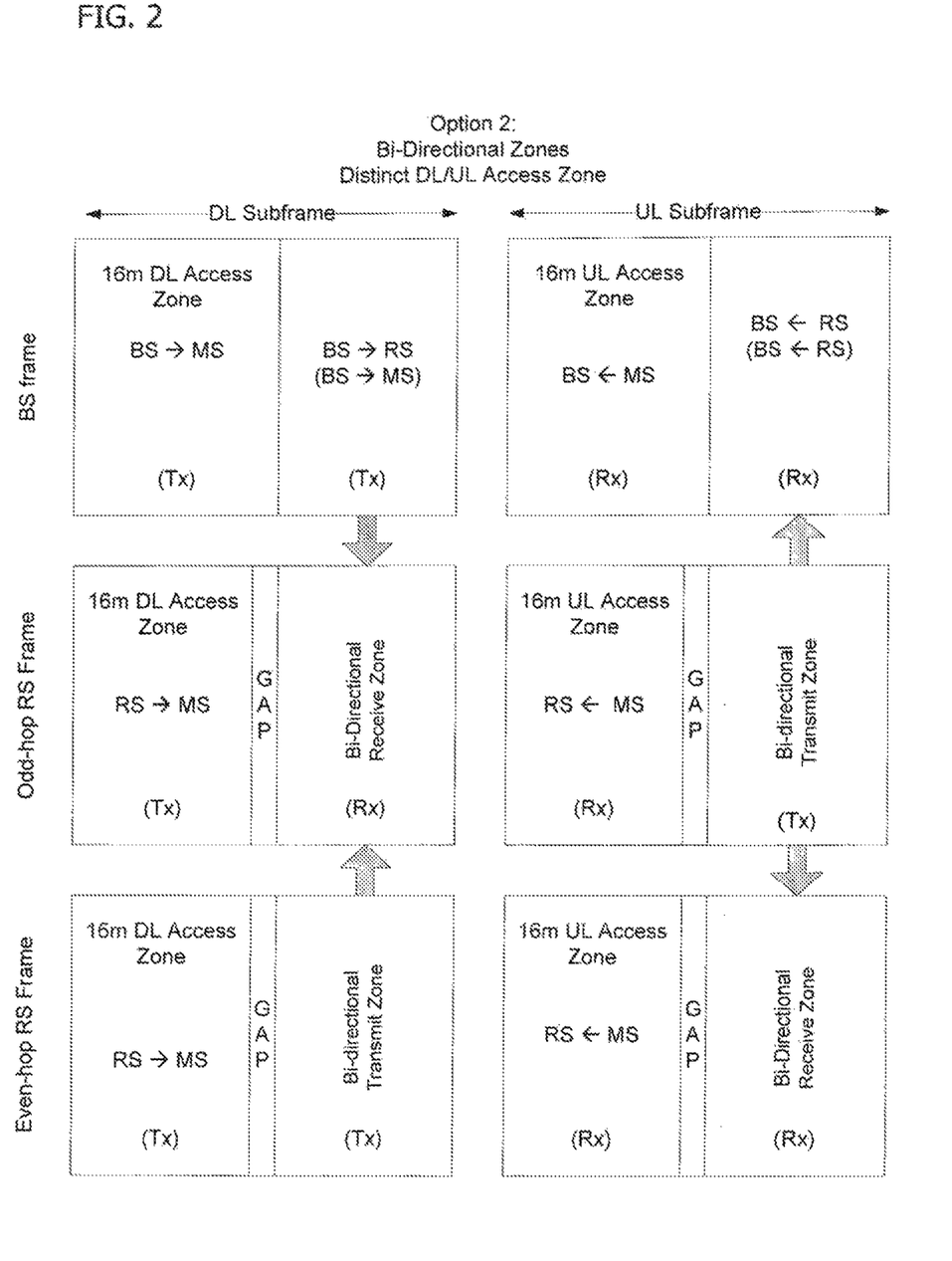
FIG. 2 illustrates an 802.16m bi-directional relay frame structure in accordance with the conventional art.

FIG. 2 illustrates an 802.16m bi-directional relay frame structure in accordance with the conventional art.

Referring to a vertical direction (i.e., column direction) of FIG. 2, the conventional 16m relay frame structure consists of a DL subframe and a UL subframe. Referring to a horizontal direction (i.e., row direction) of FIG. 2, the conventional 16m relay frame structure consists of a BS frame, an odd-hop RS frame and an even-hop RS frame.

(2-1) A transmit zone and a receive zone of a 16m RS

A bi-directional transmit zone is a transmit zone of a 16m RS, where the 16m RS may transmit data not only to a superordinate RS but also to a subordinate RS.

A bi-directional receive zone is a receive zone of a 16m RS, where the 16m RS may receive data not only from a superordinate RS but also from a subordinate RS.

(2-2) A 16m DL access zone and a 16m UL access zone

A 16m DL access zone indicates a zone where a 16m BS or a 16m RS transmits data to a 16m MS.

A 16m UL access zone indicates a zone where a 16m BS or a 16m RS receives data from a 16m MS.

The conventional 16m relay frame structure is defined as a transparent mode and a non-transparent mode according to functional characteristics. Hereinafter, the transparent mode and the non-transparent mode will be explained. In a transparent mode, a transparent RS does not transmit a preamble, an SFH, a BCH and a USCCH at a start portion of a frame. On the other hand, in a non-transparent mode, a non-transparent RS transmits a preamble, an SFH, a BCH and a USCCH at a start portion of a frame. That is, in the non-transparent mode, a control signal may be independently transmitted to a subordinate RS or an MS.

Figure 3:
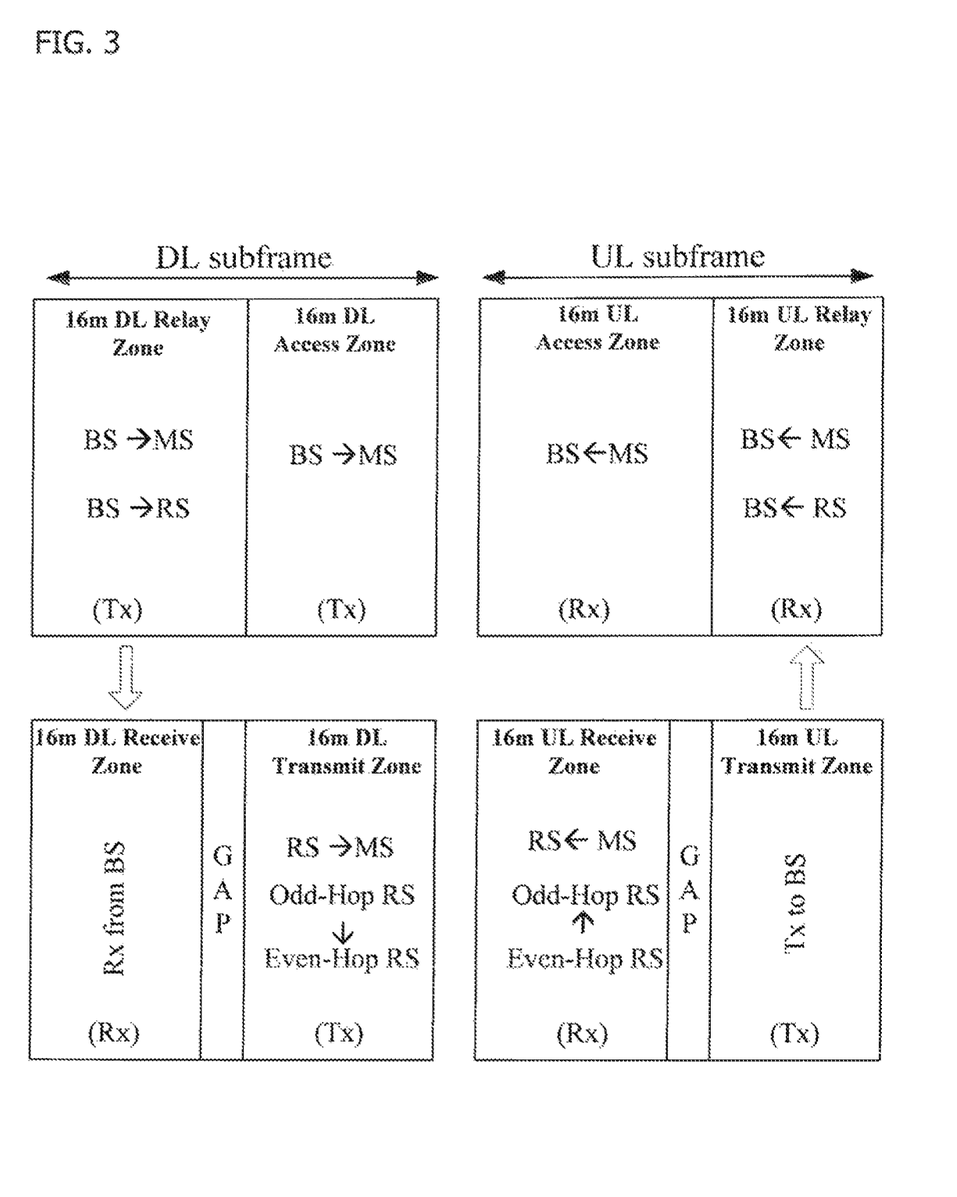
FIG. 3 illustrates a transparent relay mode frame structure in accordance with the conventional art.
Figure 4:
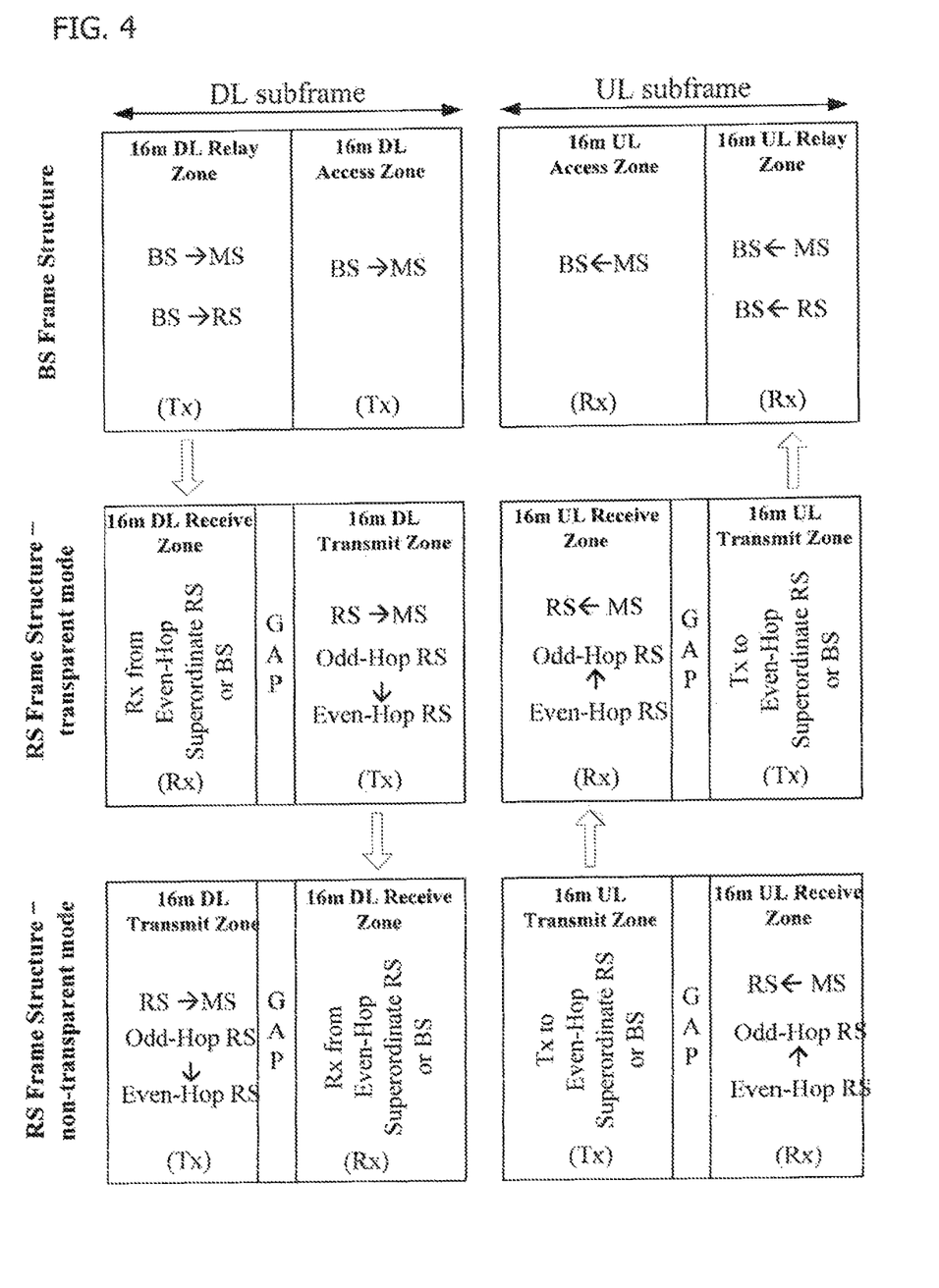
FIG. 4 illustrates a uni-directional relay frame structure for coexistence with a transparent mode and a non-transparent mode in accordance with the conventional art.

FIG. 3 illustrates a transparent relay mode frame structure in accordance with the conventional art, and FIG. 4 illustrates a uni-directional relay frame structure for coexistence with a transparent mode and a non-transparent mode in accordance with the conventional art. Referring to FIG. 4, a BS and a transparent RS are connected to each other, and a non-transparent RS performs a communication at a lower level of the transparent RS.

As aforementioned, the MS has to be directly synchronized with the BS or the RS through an uplink, or has to be indirectly UL-synchronized with the BS through the RS. Here, the MS may have a different UL transmission time according to links with the BS or the RS in various types of relay frame structures. Accordingly, required is a ranging channel with consideration of various types of relay frame structures.

DISCLOSURE OF THE INVENTION

The present inventor has devised the present invention with considering that an IEEE 802.16m relay system which supports a multi-hop relay performs UL synchronization with respect to not only a mobile station directly connected to a base station, but also a relay station directly connected to a base station and a mobile station indirectly communicating with the base station through the RS.

Therefore, an object of the present invention is to a method for transmission and configuration of a ranging channel in accordance with a variety of frame structures in a radio communication system which supports a multi-hop relay.

To achieve these and other advantages and in accordance with the purpose of the present invention, as embodied and broadly described herein, there is provided a method for transmission of a ranging channel in a radio communication system, the method for transmission of a ranging channel configured according to frame structures in a radio communication system which supports a relay, the method for transmission of a ranging channel configured according to frame structures in a radio communication system which supports a relay comprises:

configuring a ranging channel for a communication with a relay; and performing ranging procedures between a base station (BS) and a mobile station (MS) and/or a subordinate relay station (RS) through the configured ranging channel.

Preferably, the step of configuring a ranging channel comprises:

configuring a first ranging channel (e.g., ranging channel A of FIG. 5, ranging channel F of FIG. 6 and ranging channel I of FIG. 7) in an uplink subframe of a BS frame;

configuring a second ranging channel (e.g., ranging channel B of FIG. 5, ranging channel G of FIG. 6 and ranging channel J of FIG. 7) for performing random access between relay stations (RSs) directly connected to the BS; and configuring a third ranging channel (e.g., ranging channel C of FIG. 5, ranging channel H of FIG. 6 and ranging channel K of FIG. 7) and a fourth ranging channel (e.g., ranging channel D of FIG. 5, ranging channel E of FIG. 6 and ranging channel L of FIG. 7) for a transparent relay mode and a non-transparent relay mode.

Preferably, the method may further comprise transmitting, by the MS, a ranging signal including the configured ranging channels to the BS or the RS.

Preferably, the first ranging channel may be used to perform periodic ranging, and random access for handover between the BS and the MS directly connected to the BS, to perform a ranging operation between the BS and the RS, and to perform initial ranging by the MS and the RS with the BS.

Preferably, the second ranging channel may be used to perform periodic ranging, and random access for handover between the BS and the RS directly connected to the BS.

Preferably, the third ranging channel may be located at an odd-hop RS in a transparent relay mode, may have the same position and size as the first ranging channel, and [56] may provide the same function as the first ranging channel to the subordinate MS and RS.

Preferably, the second ranging channel may be used to perform periodic ranging, and random access for handover between the BS and the RS directly connected to the BS.

Preferably, the fourth ranging channel may be located at an even-hop RS in a transparent relay mode, may have the same position and size as the second ranging channel, and may provide the same function as the second ranging channel to the subordinate MS and RS.

Preferably, the third and fourth ranging channels may have positions and sizes different from those of the first and second ranging channels corresponding thereto in a non-transparent relay mode.

Preferably, the frame structure may be a uni-directional frame structure, or a bi-directional frame structure, or may be a uni-directional frame structure for coexistence with a transparent relay mode and a non-transparent relay mode.

Preferably, when the frame structure is a bi-directional frame structure, [69] the third ranging channel may be located at an odd-hop RS in a transparent relay mode, and may have different positions and sizes in an even-hop RS and an odd-hop RS in a non-transparent relay mode.

Preferably, when the frame structure is a bi-directional frame structure, [72] the fourth ranging channel may be configured for uplink synchronization of the subordinate RS in each bi-directional receive zone of an odd-hop RS and an even-hop RS.

Preferably, information on a position and a size of each ranging channel may be indicated by a downlink broadcast channel of the BS or the superordinate RS, and may be categorized according to time, a frequency, and a code.

According to another aspect of the present invention, there is provided a method for transmission of a ranging channel in a radio communication system, the method comprising:

transmitting an initial ranging code between a base station (BS) and a relay station (RS), and setting uplink ranging channels with the BS and the RS in a division manner; and performing ranging procedures through the set uplink ranging channels by a mobile station (MS), wherein the ranging channel is established by reserving a ranging code, or by dividing a specific ranging time or frequency resource.

According to still another aspect of the present invention, there is provided a method for transmission of a ranging channel in a radio communication system, the method comprising:

transmitting an initial ranging code between a base station (BS) and a relay station (RS), and receiving, by the BS, a ranging code measured by the RS;

receiving, by the BS, ranging information from the RS in response to a request; and transmitting, by a mobile station (MS), a ranging channel for uplink synchronization to the BS or the RS, based on the ranging information received from the BS.

Preferably, the ranging channel may be implemented for uplink synchronization setting between the BS and the RS, and may be supported with a common initial ranging.

Alternatively, the ranging channel may be set (established) by reserving a ranging code, or by dividing a specific ranging time and/or frequency resource.

According to yet still another aspect of the present invention, there is provided a method for transmission of a ranging channel in a radio communication system, the method comprising:

transmitting an initial ranging code between a base station (BS) and a relay station (RS), and then setting a time difference or a timing offset without setting an RS-dedicated ranging channel; and performing, by a mobile station (MS), ranging procedures based on the set time difference or the timing offset.

The present invention may have the following advantages.

Firstly, a plurality of ranging channels may be configured according to various frame structures of an IEEE 802.16m relay system. This may reduce interferences which occur during a ranging process.

Secondly, since a contention ratio may be decreased in contention-based ranging, uplink synchronization may be performed stably and rapidly.

MODES FOR CARRYING OUT THE PREFERRED EMBODIMENTS

The present invention is applied to an IEEE 802.16m system. However, the present invention is not limited to this, but may be applied to all wire/wireless communication systems and all methods for configuring a data structure to which the technical concepts of the present invention may be applied.

Various modifications and embodiments can be made in the present invention, and reference will be made in detail to the preferred embodiments of the present invention, examples of which are illustrated in the accompanying drawings. However, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

Though terms including ordinal numbers such as a first, a second, etc. may be used to explain various components, the components are not limited to the terms. The terms are used only for the purpose of distinguishing one component from another component. For instance, a first component may be referred to as a second component, or similarly, the second component may be referred to as the first component, without departing from the scope of the present invention. A term 'and/or' is used to include a combination of a plurality of disclosed items or one of the items.

In a case it is mentioned that a certain component is "connected" or "accessed" to another component, it may be understood that the certain component is directly connected or accessed to the another component or that a component is interposed between the components. On the contrary, in case it is mentioned that a certain component is "directly connected" or "directly accessed" to another component, it should be understood that there is no component therebetween.

Terms used in the present invention is to merely explain specific embodiments, thus it is not meant to be limiting. A singular expression includes a plural expression except that two expressions are contextually different from each other. In the present invention, a term "include" or "have" is intended to indicate that characteristics, figures, steps, operations, components, elements disclosed on the specification or combinations thereof exist. Rather, the term "include" or "have" should be understood so as not to pre-exclude existence of one or more other characteristics, figures, steps, operations, components, elements or combinations thereof or additional possibility.

Except that they are not differently defined, all terms used in the present invention including technical or scientific terms have the same meanings with terms that are generally understood by those skilled in the art related to the field of the present invention. The terms same as those of which are defined in a general dictionary should be understood that the terms have meanings same as contextual meanings of the related art. And, as long as the terms are not definitely defined in the present invention, the terms are not interpreted as ideal or excessively formal meanings.

Reference will now be given in detail to the preferred embodiments of the present invention, examples of which are illustrated in the accompanying drawings. Wherever possible, the same reference numerals will be used through the drawings to refer to the same or similar parts, and the same descriptions thereof are omitted.

Basic concepts of the present invention will be explained as follows. Firstly, ranging channels for uplink synchronization are different configured according to various frame structures. Secondly, uplink interferences are reduced, and uplink synchronization is performed stably and rapidly.

Figure 5:
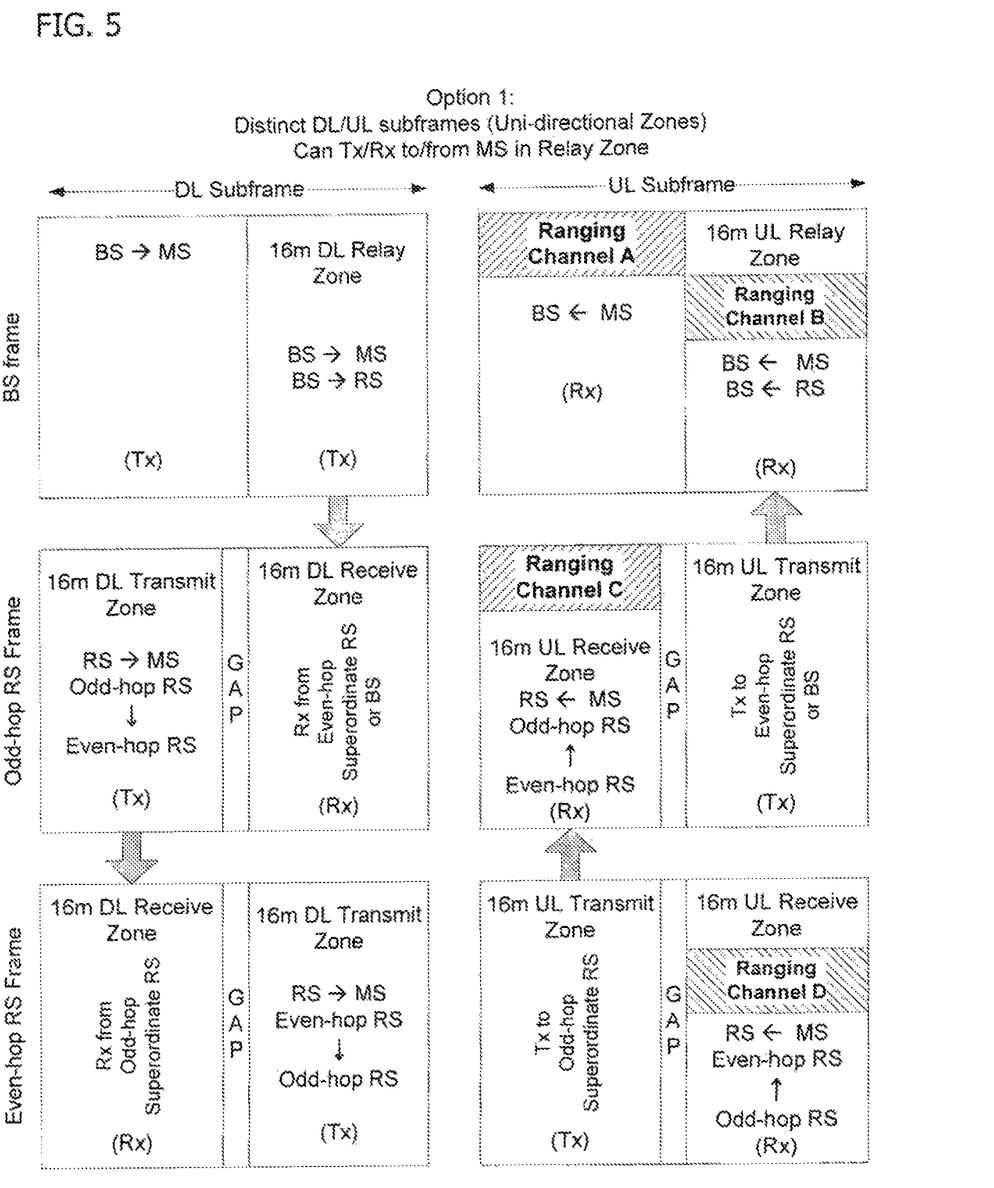
FIG. 5 illustrates a case that ranging channel A and ranging channel B constitute a BS subframe, ranging channel C constitutes an odd-hop RS frame, and ranging channel D constitutes an even-hop RS frame according to a first embodiment of the present invention.

FIG. 5 illustrates an example to constitute a relay frame structure of an IEEE 802.16m system with ranging channels according to a first embodiment of the present invention. In FIG. 5, the IEEE 802.16m system supports a uni-directional frame structure.

As shown in FIG. 5, an uplink (UL) subframe consists of four ranging channels, i.e., ranging channel A, ranging channel B, ranging channel C and ranging channel D.

In FIG. 5, the ranging channel A and the ranging channel B constitute a BS subframe, the ranging channel C constitutes an odd-hop RS frame, and the ranging channel D constitutes an even-hop RS frame. Hereinafter, an operation and a function of each ranging channel which constitutes a uni-directional frame structure will be explained.

The ranging channel A which exists in a UL subframe of a BS frame is a channel used for a ranging operation of a mobile station (MS) and/or a relay station (RS) directly connected to a base station (BS).

All the MSs and RSs of an IEEE 802.16m which supports a relay perform initial ranging through the ranging channel A.

The MS directly connected to the BS in an IEEE 802.16m system which supports a relay performs periodic ranging, and random access for handover through the ranging channel A.

The RS directly connected to the BS in an IEEE 802.16m system which supports a relay performs periodic ranging, and random access for handover through the ranging channel B.

Hereinafter, a transparent relay mode and a non-transparent relay mode will be explained.

In a transparent relay mode, the ranging channel C may be located at an odd-hop RS, may have the same position and size as the ranging channel A, and may provide the same function as the ranging channel A to the subordinate MS and RS.

In the transparent relay mode, the ranging channel D may be located at an even-hop RS, may have the same position and size as the ranging channel B, and may provide the same function as the ranging channel B to the subordinate MS and RS.

In a non-transparent relay mode, the ranging channels C and D may have positions and sizes different from those of the ranging channels A and B.

Information on a position and a size of each ranging channel in a uni-directional frame structure may be indicated by a downlink (DL) broadcast channel of the BS or the superordinate RS, and may be categorized according to time, a frequency, a code, and so on.

Figure 6:
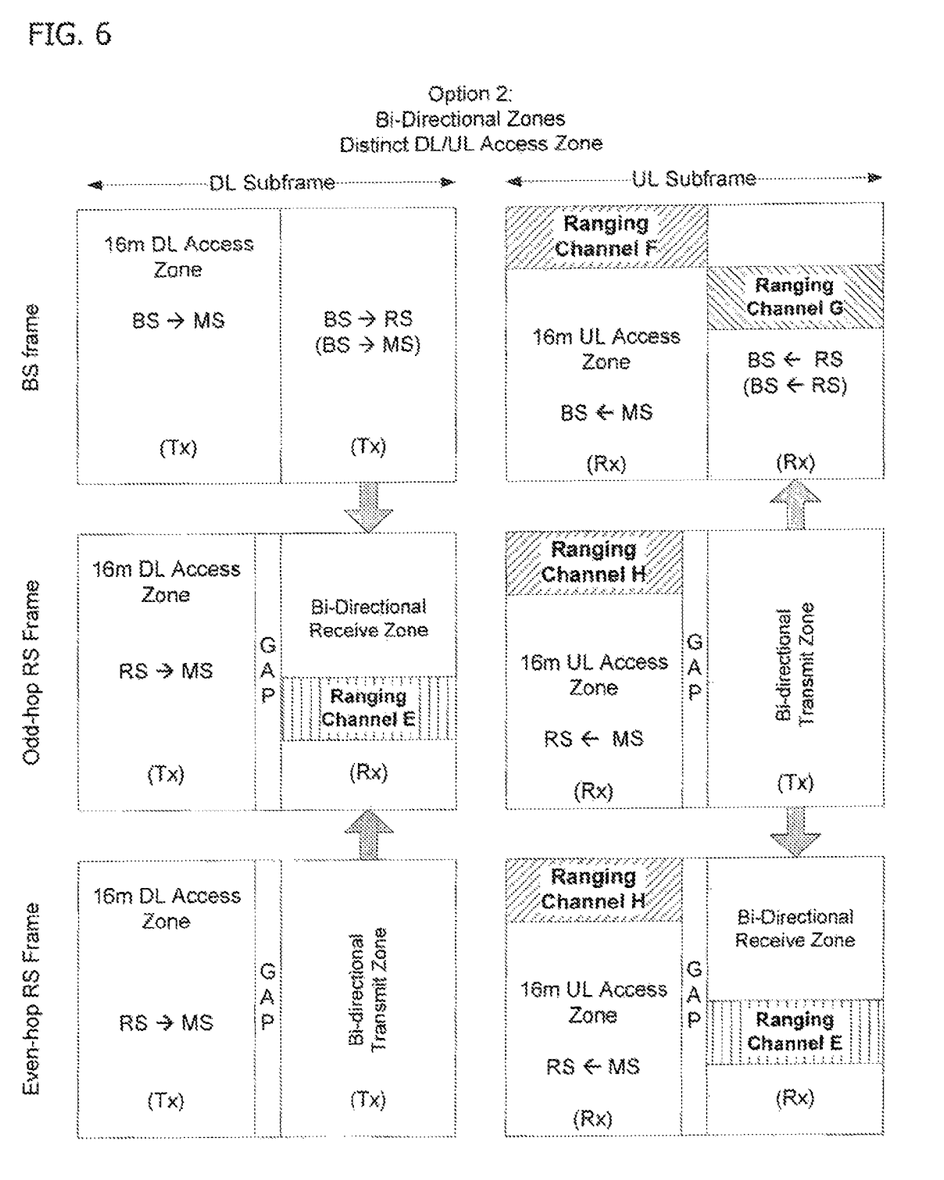
FIG. 6 illustrates an example to constitute a ranging channel in a relay frame structure of an IEEE 802.16m system according to a second embodiment of the present invention.

FIG. 6 illustrates an example to constitute a ranging channel in a relay frame structure of an IEEE 802.16m system according to a second embodiment of the present invention. In FIG. 6, an IEEE 802.16m system supports a bi-directional frame structure.

As shown in FIG. 6, four types of ranging channels, i.e., ranging channel E, ranging channel F, ranging channel G and ranging channel H are configured in a UL subframe in six in number.

In FIG. 6, the ranging channel F and the ranging channel G are configured in a UL subframe of a BS, and the ranging channel H is configured in an odd-hop RS frame of a UL subframe and in an even-hop RS frame of a UL subframe, respectively. And, the ranging channel E is configured in an even-hop RS frame of a UL subframe and at an odd-hop RS frame of a DL subframe, respectively. Hereinafter, will be explained an operation and a function of each ranging channel configured in a bi-directional frame structure.

The ranging channel F which exists in a UL subframe of a BS frame is a channel used for a ranging operation of an MS and/or an RS directly connected to a BS.

All the MSs and RSs of an IEEE 802.16m which supports a relay perform initial ranging through the ranging channel F.

The MS directly connected to the BS in an IEEE 802.16m system which supports a relay performs periodic ranging, and random access for handover through the ranging channel F.

The RS directly connected to the BS in an IEEE 802.16m system which supports a relay performs periodic ranging, and random access for handover through the ranging channel G.

Hereinafter, the ranging channels in a transparent relay mode and a non-transparent relay mode will be explained.

In a transparent relay mode, the ranging channel H may be located at an odd-hop RS, may have the same position and size as the ranging channel F, and may provide the same function as the ranging channel F to the subordinate MS and RS.

In a non-transparent relay mode, the ranging channel H of an even-hop RS and the ranging channel H of an odd-hop RS may have positions and sizes different from each other. And, the ranging channels H may have positions and sizes different from those of the ranging channel F.

Each of The odd-hop RS and the even-hop RS may have the ranging channel E for UL synchronization of the subordinate RS in a bi-directional receive zone, and may perform periodic ranging, and random access for handover. In a non-transparent relay mode, each ranging channel may have a different and size.

Information on a position and a size of each ranging channel in a bi-directional frame structure of FIG. 6 may be indicated by a DL broadcast channel of the BS or the superordinate RS, and may be categorized according to time, a frequency, a code and so on.

Figure 7:
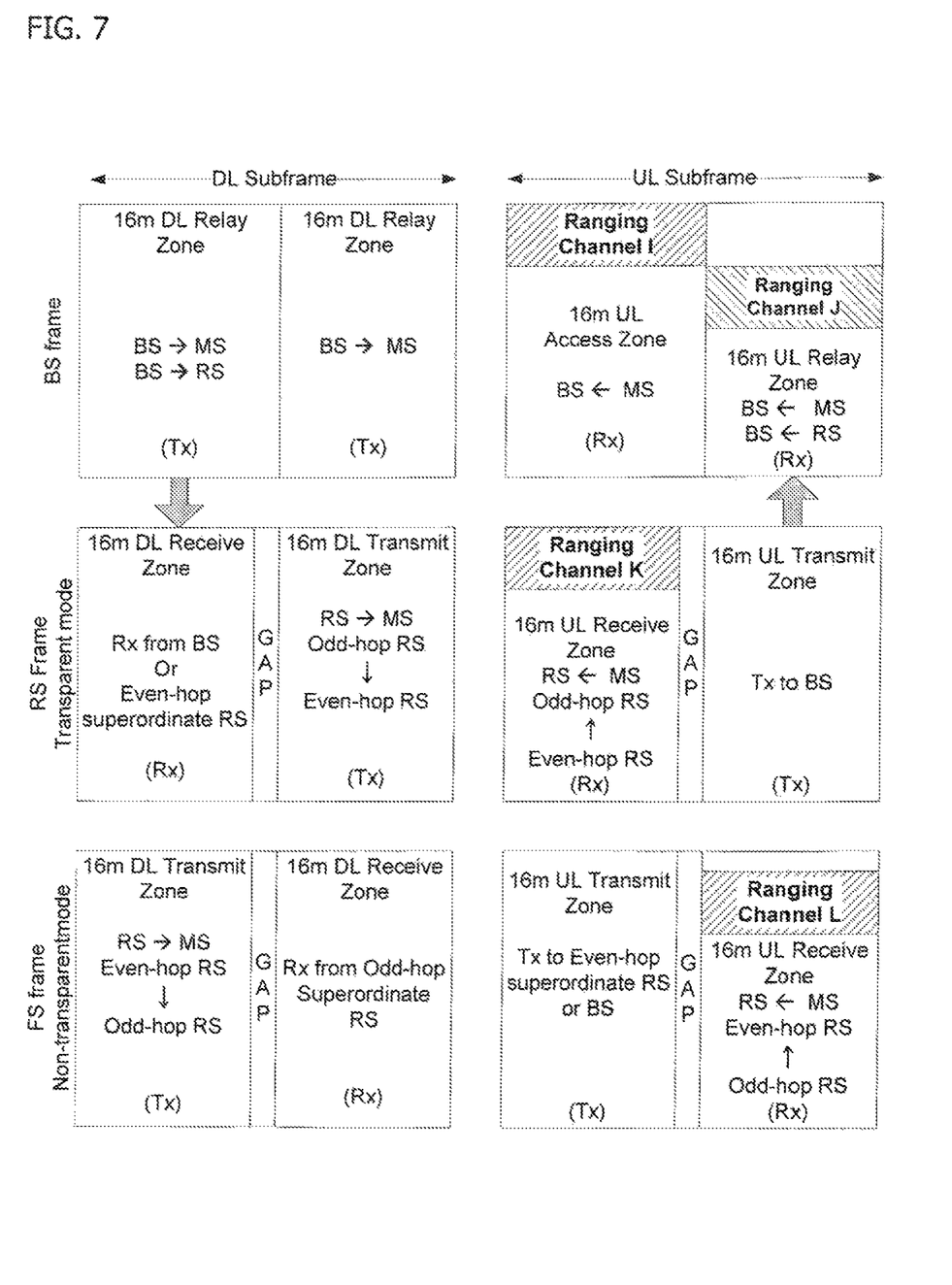
FIG. 7 illustrates an example to constitute a ranging channel in a relay frame structure of an IEEE 802.16m system according to a third embodiment of the present invention.

FIG. 7 illustrates an example to constitute a ranging channel in a relay frame structure of an IEEE 802.16m system according to a third embodiment of the present invention. In FIG. 7, an IEEE 802.16m system supports a uni-directional frame structure having ranging channels for coexistence with a transparent mode and a non-transparent mode.

As shown in FIG. 7, a UL subframe consists of four ranging channels, i.e., a ranging channel I, a ranging channel J, a ranging channel K and a ranging channel L.

In the third embodiment of FIG. 7, the ranging channel I and the ranging channel J constitute a UL subframe of a BS frame, the ranging channel K constitutes a UL subframe of a transparent mode RS frame, and the ranging channel L constitutes a UL subframe of a non-transparent mode FS frame. Hereinafter, will be explained an operation and a function of each ranging channel of a uni-directional frame structure for coexistence with a transparent mode and a non-transparent mode.

The ranging channel I which exists in a UL subframe of a BS frame is a channel used for a ranging operation of an MS or an RS directly connected to a BS.

All the MSs and RSs of an IEEE 802.16m which supports a relay perform initial ranging through the ranging channel I.

The MS directly connected to the BS in an IEEE 802.16m system which supports a relay performs periodic ranging, and random access for handover through the ranging channel I.

The RS directly connected to the BS in an IEEE 802.16m system which supports a relay performs periodic ranging, and random access for handover through the ranging channel J.

The ranging channel K may have the same position and size as the ranging channel I, and may provide the same function as the ranging channel I to the subordinate MS and RS.

The ranging channel L may have a different position and size from those of the ranging channel J.

Information on a position and a size of each ranging channel in a uni-directional frame structure may be indicated by a DL broadcast channel of the BS or the superordinate RS, and may be categorized according to time, a frequency, a code, and so on.

Hereinafter, with reference to FIGS. 8 to 10, will be explained procedures for performing a relay by the method for configuring ranging channels in accordance with a variety of frame structures. The following explanations relate to a method for acquiring initial UL synchronization with a BS and an RS with consideration of relaying.

In case of a serving BS and an RS which operates in the serving BS, UL synchronization with the BS and the RS may be differently set according to a cell size.

UL synchronization with the BS and the RS may be acquired without configuring ranging channels or without generating an additional ranging channel.

Ranging channels are configured so as to acquire UL synchronization. These ranging channels may be separately configured when acquiring UL synchronization between the BS and the RS. This means that the BS and the MS acquire UL synchronization, and then newly set UL synchronization with the RS when generating a communication link through the RS.

For instance, in case of a transparent RS, the RS transmits a UL ranging signal based on ranging configuration information received from the BS when performing an initial network entry through the BS. As a result, the MS compensates for timing and a frequency offset between the BS and the RS. Then, the MS requested to set a relay link from the BS based on an RS measurement report, etc. newly transmits a signal to the RS so as to acquire UL synchronization with the RS. In this case, an initial ranging signal of the BS and a ranging signal of the RS are set in the following manner.

Figure 8:
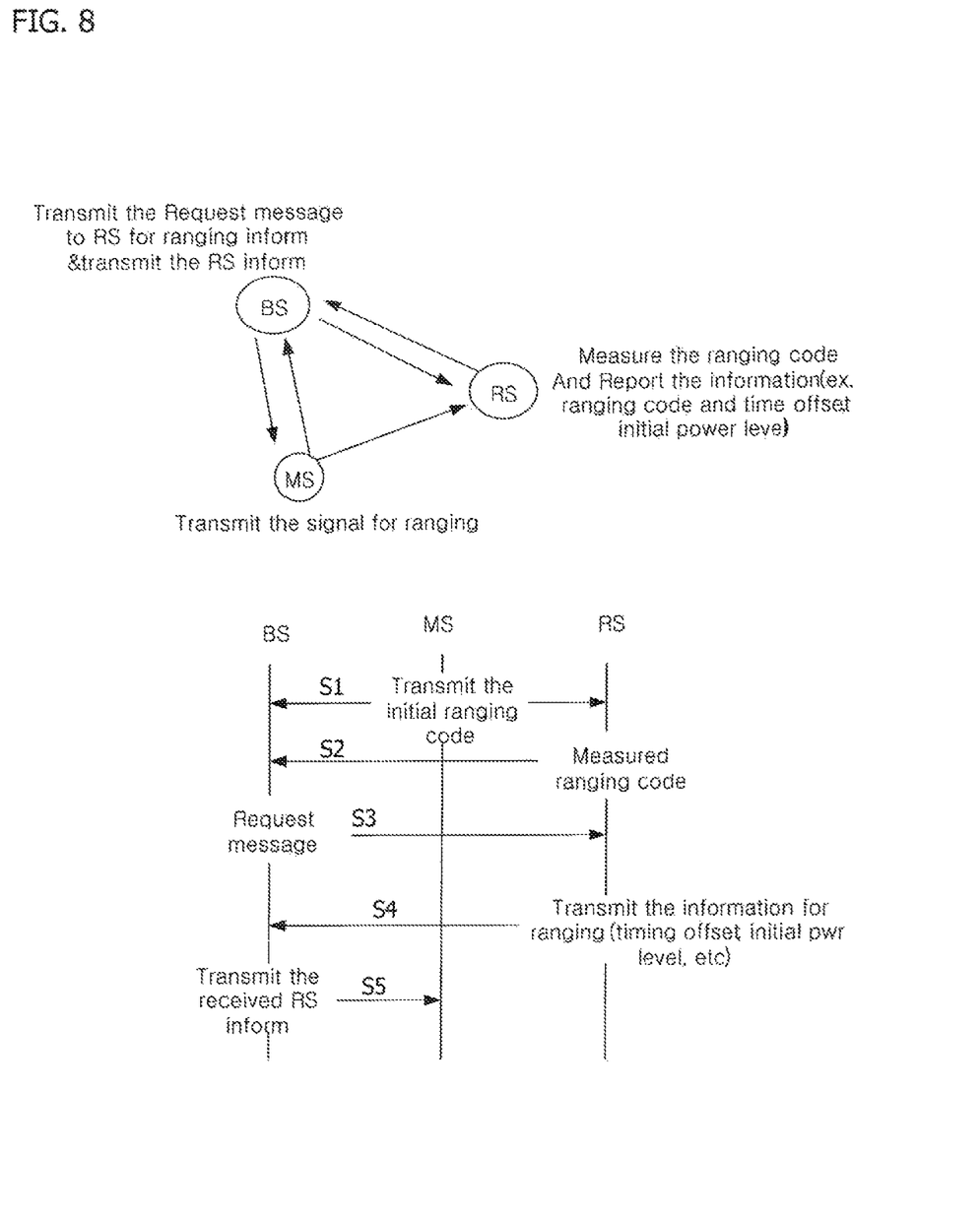
FIG. 8 is a block diagram and a signal flowchart showing relay procedures of a non-transparent RS, in which a ranging channel for setting uplink (UL) synchronization with a BS and an RS is supported through common initial ranging according to the present invention.

FIG. 8 is a block diagram and a signal flowchart showing relay procedures of a transparent RS according to the present invention, in which ranging channels for setting UL synchronization with a BS and an RS are supported through common initial ranging. FIG. 8 shows a case that a link is set between a BS and an MS as the MS receives a control signal from the BS.

Figure 9:
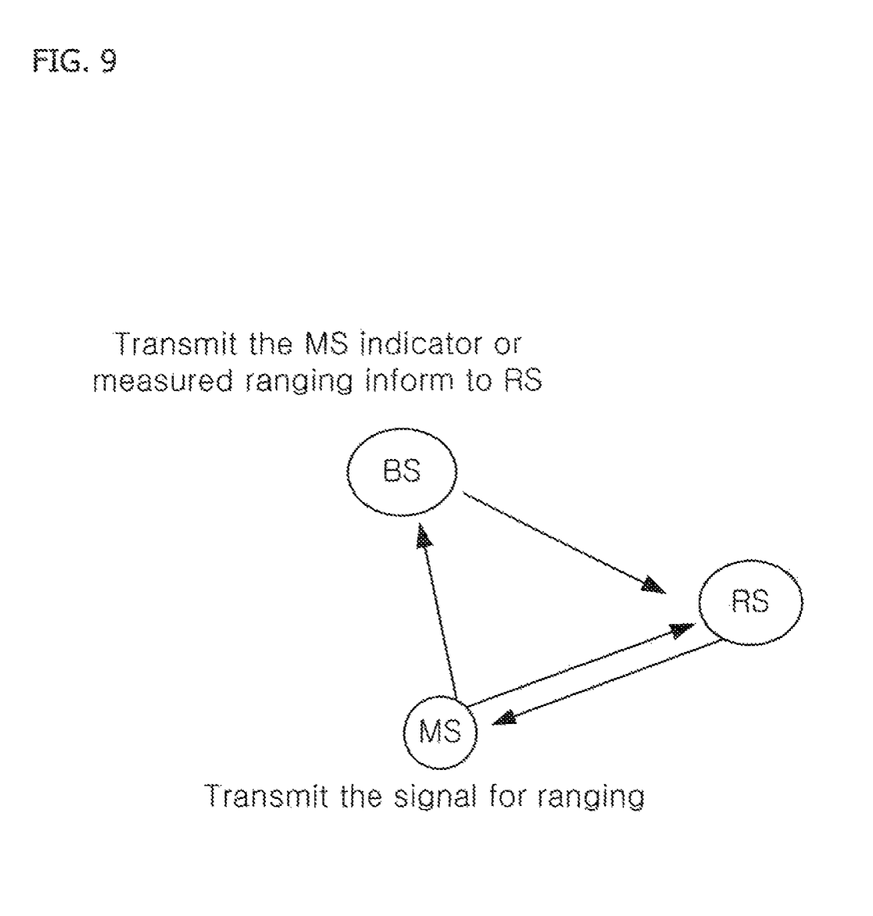
FIG. 9 is a block diagram which illustrates relay procedures of a non-transparent RS, in which a ranging channel for setting uplink (UL) synchronization with a BS and an RS is supported through common initial ranging according to the present invention.

FIG. 9 is a block diagram showing relay procedures of a non-transparent RS according to the present invention, in which ranging channels for setting UL synchronization with a BS and an RS are supported through common initial ranging. FIG. 9 shows a case that a link is set between a BS and an RS, and the RS transmits a control signal to an MS thus to be independently operated from the MS.

More concretely, FIGS. 8 and 9 show a case that an opportunity is not orthogonally divided by using regions, codes, etc., but is commonly used for setting of UL synchronization with the BS and the RS.

Hereinafter, an operation of each component will be explained with reference to FIG. 8.

The BS transmits a message requesting ranging information to the RS, and transmits ranging information received from the RS to the MS.

The RS measures a ranging code, and reports, to the BS, ranging information such as a ranging code, a time offset and an initial power level.

The MS transmits a ranging signal to the BS and/or the RS, based on the ranging information received from the BS.

The embodiment of FIG. 8 will be explained in more details.

In a contention-based ranging structure, it is impossible to check whether an initial ranging code detected by the BS and the RS is for synchronization between the MS and the BS, or for synchronization between the MS and the RS. This may require the operations of the BS and the RS to be defined in advance in ranging procedures.

Using a common ranging zone is limited to a case where signaling is performed between the BS and the MS. The reason is because the MS can set (establish) a link with the BS in a transparent mode.

A common ranging zone is defined only between the BS and the MS, and a ranging code transmitted from the MS is received by the BS and the RS. That is, the ranging code transmitted to the BS from the MS is received by the RS. After receiving an initial ranging code by the BS and the RS (S1), the RS reports, to the BS, information on a measured ranging code (S2). Then, the BS requests, from the RS, information for supporting the MS, i.e., ranging information for acquiring synchronization with the MS, e.g., a timing offset, a power level for initial power control, etc. (S3). Then, the BS receives the requested ranging information from the RS (S4), and transmits the received ranging information to the MS (S5).

FIG. 9 is a block diagram and a signal flowchart showing relay procedures of a non-transparent RS, in which a ranging channel for setting uplink (UL) synchronization with a BS and an RS is supported through common initial ranging according to the present invention.

In FIG. 9, an RS is capable of performing a ranging independently. Accordingly, the existing initial ranging procedures between a BS and an MS are performed between the RS and the MS. In case of performing a ranging between the RS and the MS based on ranging information measured by the BS, the BS transmits, to the RS, the measured ranging information and information on the MS, through a link set between the BS and the RS, so that the RS can perform a ranging with the MS.

Hereinafter, an operation of each component will be explained with reference to FIG. 9.

The BS transmits, to the RS, an MS indicator or measured ranging information.

The RS performs ranging procedures with the MS based on the ranging information received from the BS.

The MS transmits a ranging signal to the BS and/or the RS, based on the ranging information received from the RS.

The embodiment of FIG. 9 will be explained in more details. In a non-transparent mode, the RS has a capability to support a control channel with respect to the BS. Accordingly, when transmitting through common ranging, a link has to be set between the RS and the BS. Here, the BS may inform an MS indicator to the RS based on detected ranging information, so that the RS may perform an independent operation from the MS. However, when performing the common zone-based ranging, it is difficult for the BS and the RS to perform ranging effectively and individually. This may result in an additional signaling or additional procedures.

Hereinafter, will be explained a case for supporting a ranging channel for setting of UL synchronization with the BS and the RS, in an orthogonal division manner.

In this case, a ranging channel for UL synchronization with the BS and the RS is set in a division manner. In case of a general ranging opportunity, when the BS or the RS receives to detect a ranging channel transmitted from the MS, e.g., when a ranging code is reserved according to each channel or when a specific ranging-time or frequency-resource is set in a division manner, a signal transmitted from the MS may be set for synchronization with the RS, or synchronization with the BS. As one example, among ranging codes of '0~100', ranging codes of '0~80' are used for 'BS to MS' and the rest codes are used for 'RS to MS'. Here, a ranging channel may be checked according to a ranging code.

Figure 10:
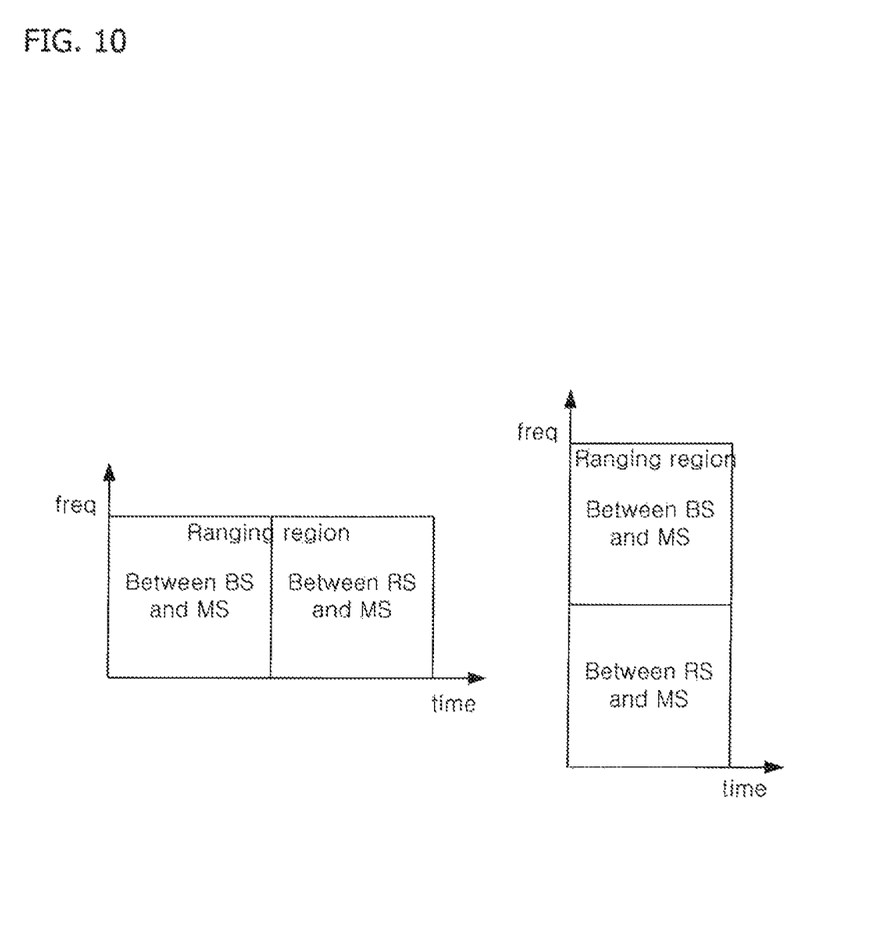
FIG. 10 illustrates an example to set a UL ranging channel in a division manner, in which a ranging zone is divided according to time and a frequency according to the present invention.

As another example, as shown in FIG. 10, a ranging zone is used in a division manner according to a time or a frequency. In this case, the MS selects and transmits a specific code and slot (resource) to the BS or the RS for synchronization acquisition, based on contention, thereby performing ranging procedures with the BS or the RS. However, this may require additional allocations of resources. When compared with synchronization setting with the BS, synchronization setting with the RS requires fine tuning. Accordingly, ranging procedures may be performed not through initial ranging, but through periodic ranging. Here, information on an opportunity in corresponding periodic ranging is transmitted to the MS and the RS by the BS. This may allow UL synchronization update and/or synchronization acquisition based on a period ranging between the MS and the RS.

So far, a case to set an RS-dedicated ranging channel was explained.

Hereinafter, will be explained a case not to set an RS-dedicated ranging channel.

In this case, the RS sets an uplink with a time offset with respect to the BS. More concretely, the BS transmits, to the MS, a time offset or a timing difference between the BS and the RS, thereby directly transmitting to a UL without setting an additional ranging channel.

This will be explained in more details. Synchronization with the BS is absolutely necessary when performing initial network entry, especially, in a transparent relay mode. Here, the reason why initial ranging procedures are repeatedly set based on contention for UL synchronization with the RS is because available information when setting initial synchronization with the BS is different from that when setting synchronization with the RS. Accordingly, it may not be preferable to set the same procedures and the same channels. Generally, the RS sets an uplink with the BS with a predetermined time offset based on an absolute time of the BS. And, the BS may acquire a UL timing offset with the RS based on the set UL. When the MS initially enters a network and then moves to the RS, the BS informs synchronization information with the RS to the MS. This may not require an additional process of generating and transmitting a UL synchronization ranging signal. The BS has already performed UL synchronization setting with the MS, and has already performed UL synchronization setting with the set RS. Accordingly, the BS may inform a timing difference between the BS and the MS or between the BS and the RS to the MS, or may transmit processed information on a timing offset to the RS thus to perform direct UL transmission. Furthermore, in the case that an RS-dedicated ranging channel is not set, the BS has to provide, to the MS, information on a power level of the RS, the information which has been provided through a ranging channel for power adjustment of the MS.

In addition, the above various embodiments may be implemented by using, computer software, hardware, or some combination thereof. For instance, the method of the present invention may be stored in a storage medium (e.g., internal memory, flash memory, hard disc, etc.), or may be implemented in codes or commands inside a software program that can be executed by a processor such as a microprocessor inside a UE.

So far, the present invention was explained in detail with reference to the preferred embodiments illustrated in the accompanying drawings. However, this is merely exemplary. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for ranging through ranging channels configured according to a frame structure in a radio communication system which supports a relay station (RS), the method comprising:
configuring the ranging channels for a communication with the RS, the ranging channels including a first ranging channel located in an uplink subframe of a base station (BS) frame, a second ranging channel located in the uplink subframe of the BS frame, a third ranging channel located in an even-hop RS frame, and a fourth ranging channel located in an odd-hop RS frame; and
performing ranging procedures between a BS and a mobile station (MS) and/or a subordinate RS through the configured ranging channels,
wherein the third ranging channel has same position and size as the first ranging channel, and the fourth ranging channel has same position and size as the second ranging channel, when the RS is in a transparent relay mode, and
wherein the third ranging channel has different position and size from the first ranging channel, and the fourth ranging channel has different position and size from the second ranging channel, when the RS is in a non-transparent relay mode.

2. The method of claim 1, further comprising transmitting, by the MS, a ranging signal through the configured ranging channels to the BS or the RS.

3. The method of claim 1, wherein the first ranging channel is used to perform an initial ranging, a periodic ranging, and handover between the BS and the MS directly connected to the BS, and to perform a periodic ranging and a handover between the BS and the RS.

4. The method of claim 1, wherein the second ranging channel is used to perform periodic ranging, and random access for handover between the BS and the RS directly connected to the BS.

5. The method of claim 1, wherein the third ranging channel provides the same function as the first ranging channel to a subordinate MS and a subordinate RS.

6. The method of claim 1, wherein the fourth ranging channel provides the same function as the second ranging channel to a subordinate MS and a subordinate RS.

7. The method of claim 1, wherein the frame structure is a uni-directional frame structure, or a bi-directional frame structure, or a uni-directional frame structure for coexistence with the transparent relay mode and the non-transparent relay mode.

8. The method of claim 1, wherein when the frame structure is a bi-directional frame structure, the third ranging channel is located at the odd-hop RS frame in the transparent relay mode, and has different positions and sizes in the even-hop RS frame and the odd-hop RS frame in the non-transparent relay mode.

9. The method of claim 1, wherein when the frame structure is a bi-directional frame structure, the fourth ranging channel is configured for uplink synchronization of the subordinate RS in each bi-directional receive zone of an odd-hop RS and an even-hop RS.

10. The method of claim 1, wherein information on a position and a size of each ranging channel is indicated by a downlink broadcast channel of the BS or a superordinate RS, and is categorized according to time, a frequency, and a code.

11. A method for ranging through ranging channels in a radio communication system, the method comprising:
setting the ranging channels with a base station (BS) and a relay station (RS) in a division manner; and
performing ranging procedures through the ranging channels by a mobile station (MS),
wherein the ranging channels are established by reserving a ranging code, or by dividing a specific ranging time or frequency resource,
wherein the ranging channels include a first ranging channel located in an uplink subframe of a BS frame, a second ranging channel located in the uplink subframe of the BS frame, a third ranging channel located in an even-hop RS frame, and a fourth ranging channel located in an odd-hop RS frame,
wherein the third ranging channel has same position and size as the first ranging channel, and the fourth ranging channel has same position and size as the second ranging channel, when the RS is in a transparent relay mode, and
wherein the third ranging channel has different position and size from the first ranging channel, and the fourth ranging channel has different position and size from the second ranging channel, when the RS is in a non-transparent relay mode.

12. A method for ranging through ranging channels in a radio communication system, the method comprising:
transmitting an initial ranging code between a base station (BS) and a relay station (RS), and receiving, by the BS, a ranging code measured by the RS;
receiving, by the BS, ranging information from the RS in response to a request; and
performing, by a mobile station (MS), ranging procedures through ranging channels for uplink synchronization to the BS or the RS, based on the ranging information received from the BS,
wherein the ranging channels include a first ranging channel located in an uplink subframe of a BS frame, a second ranging channel located in the uplink subframe of the BS frame, a third ranging channel located in an even-hop RS frame, and a fourth ranging channel located in an odd-hop RS frame,
wherein the third ranging channel has same position and size as the first ranging channel, and the fourth ranging channel has same position and size as the second ranging channel, when the RS is in a transparent relay mode, and
wherein the third ranging channel has different position and size from the first ranging channel, and the fourth ranging channel has different position and size from the second ranging channel, when the RS is in a non-transparent relay mode.

13. The method of claim 12, wherein the ranging channels are implemented for uplink synchronization setting between the BS and the RS, and are supported with a common initial ranging, or
wherein the ranging channels are established by reserving a ranging code, or by dividing a specific ranging time and/or frequency resource.

* * * * *